US012785189B2

(12) United States Patent
Kim

(10) Patent No.: US 12,785,189 B2
(45) Date of Patent: Nov. 3, 2026

(54) BATTERY FIRE SAFETY STRUCTURE HAVING NON-POWERED LIQUID IMMERSION CIRCULATION SYSTEM

(71) Applicant: SEOYON E-HWA CO., LTD., Anyang (KR)

(72) Inventor: Sung Su Kim, Incheon (KR)

(73) Assignee: SEOYON E-HWA CO., LTD., Anyang (KR)

( * ) Notice: Subject to any disclaimer, the term of this patent is extended or adjusted under 35 U.S.C. 154(b) by 493 days.

(21) Appl. No.: 18/500,118

(22) Filed: Nov. 2, 2023

(65) Prior Publication Data

US 2024/0332697 A1 Oct. 3, 2024

(30) Foreign Application Priority Data

Mar. 30, 2023 (KR) ........................ 10-2023-0041839

(51) Int. Cl.

| | |
|---|---|
| ***H01M 10/6551*** | (2014.01) |
| ***H01M 10/653*** | (2014.01) |
| ***H01M 10/6567*** | (2014.01) |
| ***H01M 50/24*** | (2021.01) |
| ***H01M 50/317*** | (2021.01) |

(52) U.S. Cl.

CPC ......... *H01M 50/24* (2021.01); *H01M 10/653* (2015.04); *H01M 10/6551* (2015.04); *H01M 10/6567* (2015.04); *H01M 50/317* (2021.01)

(58) Field of Classification Search

CPC ............. H01M 50/24; H01M 10/6567; H01M 10/652; H01M 50/317; H01M 10/653; H01M 10/6551

USPC .......................................................... 429/120

See application file for complete search history.

(56) References Cited

U.S. PATENT DOCUMENTS

| | | | | |
|---|---|---|---|---|
| 10,601,089 B2 * | 3/2020 | Lee | ...................... | H01M 50/211 |
| 2018/0205124 A1 | 7/2018 | Lee | | |
| 2019/0098761 A1 | 3/2019 | Yoshida | | |
| 2019/0098796 A1 * | 3/2019 | Wakino | ............. | H05K 7/20272 |

FOREIGN PATENT DOCUMENTS

| | | | |
|---|---|---|---|
| CN | 109659644 A | 4/2019 | |
| CN | 114122562 A * | 3/2022 | ........ H01M 10/6556 |
| JP | 2006331956 A | 12/2006 | |

(Continued)

OTHER PUBLICATIONS

Translation KR 20100068097 (Year: 2010).*

(Continued)

*Primary Examiner* — Jennifer McNeil

(74) *Attorney, Agent, or Firm* — Harvest IP Law, LLP

(57) ABSTRACT

A battery fire safety structure to which a non-powered liquid immersion circulation system is applied is provided. A battery fire safety structure including a case having an inner space, a battery disposed in the case, and a first solution and a second solution formed of liquids having electrical insulation properties that absorb heat generated in the battery and disposed in the case so that the battery is immersed in the first solution and the second solution may be provided, wherein the second solution is formed to have a specific gravity greater than a specific gravity of the first solution, and when the battery is not used, the first solution is disposed above the second solution.

7 Claims, 3 Drawing Sheets

(56) References Cited

FOREIGN PATENT DOCUMENTS

| | | | | | |
|---|---|---|---|---|---|
| JP | 2008130489 | A | * | 6/2008 | H01G 11/18 |
| JP | 2010-146883 | A | | 7/2010 | |
| JP | 2019061439 | A | | 4/2019 | |
| KR | 20100068097 | A | * | 6/2010 | H01M 10/613 |
| WO | WO-2008120056 | A1 | * | 10/2008 | H01M 10/6567 |
| WO | WO-2020130721 | A1 | * | 6/2020 | H01M 50/229 |
| WO | WO-2023222013 | A1 | * | 11/2023 | H01M 50/227 |

OTHER PUBLICATIONS

Translation JP 2008130489 (Year: 2008).*
Translation WO 2020130721 (Year: 2020).*
Translation WO 2023222013 (Year: 2023).*
Translation CN 114122562 (Year: 2022).*
The Office Action issued by the Deutsches Patent Office on Feb. 17, 2025.
Office Action From Indian Patent Office Dated Apr. 17, 2026 Issued for Corresponding Indian Patent Application.

* cited by examiner

BATTERY FIRE SAFETY STRUCTURE HAVING NON-POWERED LIQUID IMMERSION CIRCULATION SYSTEM

CROSS-REFERENCE TO RELATED APPLICATION(S)

This application claims priority from Korean Patent Application No. 10-2023-0041839, filed on Mar. 30, 2023 in the Korean Intellectual Property Office, the disclosure of which is incorporated herein by reference in its entirety.

BACKGROUND

1. Field

The following description relates to a battery fire safety structure to which a non-powered liquid immersion circulation system is applied.

2. Description of Related Art

Vehicles that can be driven using existing fossil fuels are causing problems such as environmental pollution and resource depletion. Specifically, fossil energy reserves are gradually decreasing, and exhaust gas generated from the vehicles is causing environmental pollution. That is, in recent years, research and release of electric vehicles that use electricity as power sources instead of fossil fuels have been actively conducted.

Batteries used as power sources for such electric vehicles are mainly lithium-ion secondary batteries, and battery packs including such secondary batteries are being developed and distributed. Specifically, units constituting the battery may include a plurality of battery cells composed of a plurality of lithium-ion secondary batteries, a battery module in which a plurality of battery cells are connected, and a battery pack in which battery modules are connected in series and/or parallel.

In addition, battery cells, battery modules, and battery packs composed of secondary batteries are not only used as power sources for electric vehicles but also variously used for industrial use in robotics and industrial environments.

Since the battery module generates heat while being charged or discharged, a battery cooling device is typically included along with the battery in the electric vehicle, and the battery cooling device includes a cooling fluid. The cooling fluid absorbs the heat radiated from the battery module and controls the temperature of the battery module.

However, a method of arranging a battery cooling device in a battery case to lower the temperature of the battery module can prevent a battery fire, but is not a structure that can ultimately prevent a fire. In addition, the colling device has a disadvantage of continuously requiring energy for forcibly circulating a cooling fluid. That is, there is a need for a battery fire safety structure that can prevent fires due to thermal runaway and reduce energy consumption while thermally managing a battery at a weight level including a conventional cooling device.

SUMMARY

Embodiments of the present invention are directed to providing a battery fire safety structure to which a non-powered liquid immersion circulation system is applied and which effectively manages a temperature of a battery, prevents fires, and reduces energy consumption to increase a lifetime of the battery.

However, technical objectives to be accomplished by embodiments of the present invention are not necessarily limited to the above-described technical objectives. Other technical objectives that are not described above will be clearly understood by those skilled in the art to which the embodiments of the present invention belong from other descriptions of the specification such as the detailed description.

In one aspect of the present invention, a battery fire safety structure includes a case having an inner space, a battery disposed in the case, and a first solution and a second solution formed of liquids having electrical insulation properties that absorb heat generated in the battery and disposed in the case so that the battery is immersed in the first solution and the second solution, wherein the second solution is formed to have a specific gravity greater than a specific gravity of the first solution, and when the battery is not used, the first solution is disposed above the second solution.

DETAILED DESCRIPTION

Hereinafter, embodiments of the present invention will be described with reference to the accompanying drawings. The following embodiments may be provided to more completely describe the present invention to those skilled in the art. However, the following embodiments are provided to facilitate understanding of the present invention, and the scope of the present invention is not necessarily limited thereto. In addition, detailed descriptions of known components determined to unnecessarily obscure the technical gist of the present invention will be omitted.

Figure 1:
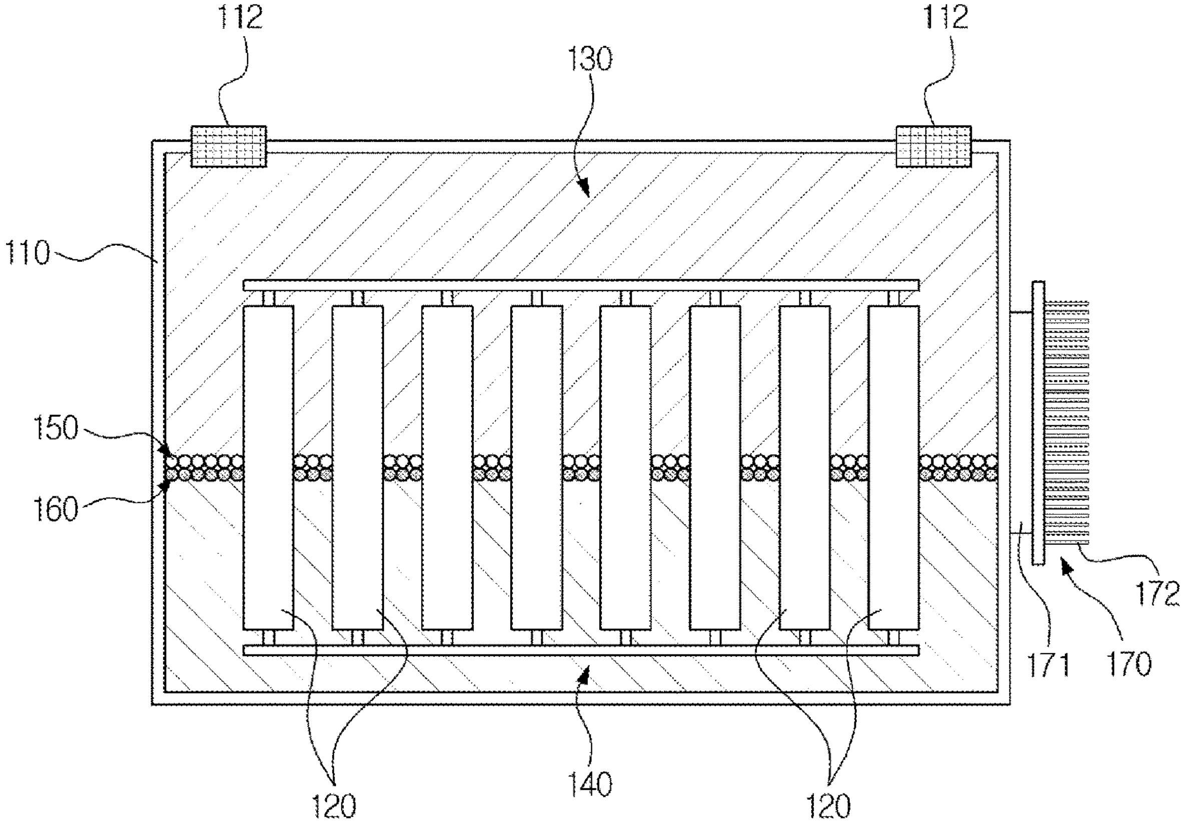
FIG. 1 is a cross-sectional view of a battery fire safety structure according to one embodiment of the present invention.
Figure 2:
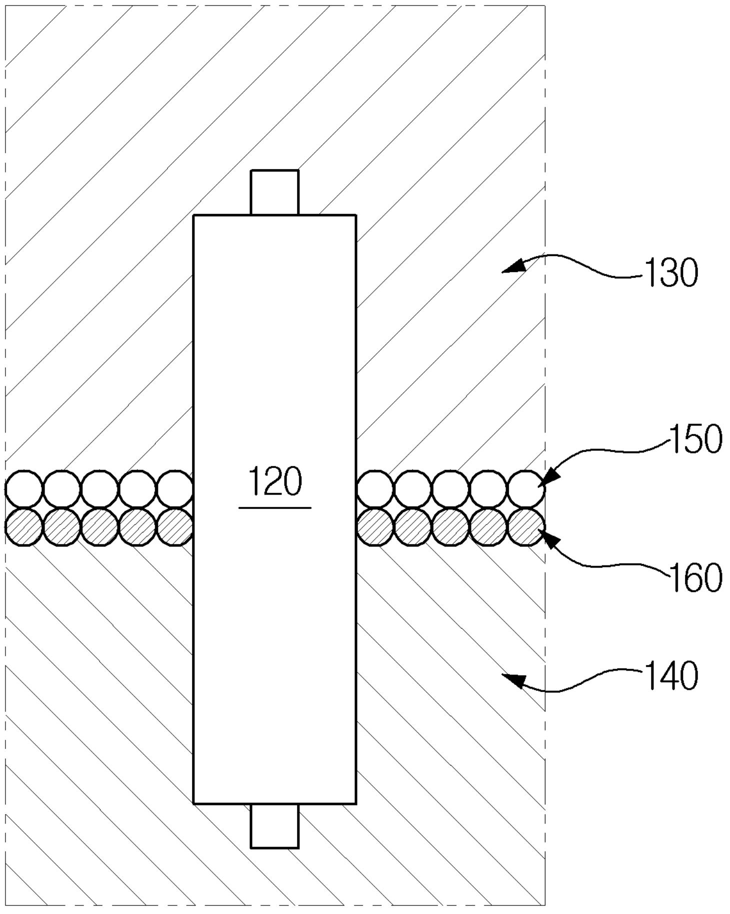
FIG. 2 is an enlarged view of the battery fire safety structure illustrated in FIG. 1.

FIG. 1 is a cross-sectional view of a battery fire safety structure according to one embodiment of the present invention. FIG. 2 is an enlarged view of the battery fire safety structure illustrated in FIG. 1.

Referring to FIGS. 1 to 2, a battery fire safety structure 100 of the present embodiment may be applied to a structure in which battery cells are accommodated in a case. Specifically, the battery fire safety structure 100 may be applied to a battery module, a battery pack, a battery system, and the like, in which a plurality of battery cells are disposed. More specifically, in the battery fire safety structure 100, a coolant may be directly injected into the case in which the battery cells are accommodated, and thus the battery cell may be immersed in the coolant and effectively cooled.

Specifically, the battery fire safety structure 100 includes a case 110 having an inner space, a battery 120 disposed in the case, a first solution 130 and a second solution 140, which are coolants injected into the case 110, a first circulation promoter 150 and a second circulation promoter 160, which are disposed in the case 110 and promote circulation of the first solution 130 and the second solution 140, and a heat radiation part 170 disposed on an outer surface of the case 110 to radiate heat absorbed by the first solution 130 and the second solution 140 to the outside.

Hereinafter, the above-described components will be described in more detail.

The case 110 is formed of a member having an inner space, and the battery 120 may be disposed in the case 110. Specifically, the case 110 may be formed as a cover of a battery system, such as a cover of a battery module or a cover of a battery pack. That is, the case 110 may be formed as a cover in which a plurality of battery cells, battery modules, or the like are disposed.

The case 110 of the present invention may be formed in various shapes and sizes according to applied fields, and specific shape features thereof are not limited.

Preferably, the case 110 is formed with a completely sealed structure so that a liquid does not leak to the outside even when the liquid is disposed in the case 110.

Specifically, the case 110 may include discharge valves 112 for allowing gas generated in the case 110 to be discharged as necessary. The discharge valves 112 may be disposed on one side of the case 110 to pass through the case 110. Specifically, the discharge valves 112 may be disposed to discharge gas generated when thermal runaway of the battery 120 occurs due to stress, abuse, or the like to the outside of the case 110 to lower an internal pressure of the case 110.

Preferably, relief valves, specifically, direct-acting relief valves, may be used as the discharge valves 112. Since the technology of the direct-acting relief valves is widely known, the detailed description thereof will be omitted. The discharge valves 112 may be disposed on an upper surface or an upper end of a side surface of the case 110 to discharge gas moved upward in a housing.

Meanwhile, the battery 120 may be provided as a plurality of batteries 120 disposed in the case 110. When the battery 120 is charged and discharged many times, excessive heat may be generated, and a swelling phenomenon in which a surface swells may occur. That is, the battery 120 should be cooled so as not to overheat during use.

The battery 120 of the present invention may be a battery cell, a battery module, or a battery pack, and the case 110 may be formed as a cover in which a plurality of the battery cells, battery modules, or battery packs are disposed.

The first solution 130 and the second solution 140 may be formed of cooling liquids having electrical insulation properties and disposed in the case 110. Specifically, the first solution 130 and the second solution 140 allow the battery 120 to be directly immersed in coolants to effectively cool the battery 120 and prevent a fire.

More specifically, non-conductive, and chemically and thermally stable materials may be used as the first solution 130 and the second solution 140, and the battery 120 may be directly immersed and cooled therein. In addition, the first solution 130 and the second solution 140 are formed of materials that do not chemically react with each other such that, even when the two solutions are injected into the case 110, the two solutions may not react with each other and may remain in their initial states.

In detail, since the first solution 130 has a lower specific gravity than the second solution 140, when disposed in the case 110 with the second solution 140 at the same time, the first solution 130 may be disposed above the second solution 140. Preferably, the first solution 130 may have a specific gravity of 0.7 to 0.75. For example, mineral oil may be used for all or part of the first solution 130.

Since the second solution 140 has a greater specific gravity than the first solution 130, when the second solution 140 is disposed in the case 110 with the first solution 130 at the same time, the second solution 140 may be disposed under the first solution 130. Preferably, the second solution 140 may have a specific gravity of 1.8 to 1.9. For example, a perfluorocarbon solution, specifically, an FC-3283 solution, which is a Fluorinert solution from 3M, may be used for all or part of the second solution 140.

Meanwhile, the first circulation promoter 150 and the second circulation promoter 160 may be formed of solid-state materials, which do not chemically react with the first solution 130 and the second solution 140. Preferably, the first circulation promoter 150 and the second circulation promoter 160 may be formed in granular forms, specifically, in spherical granular forms each having a diameter of 1 mm to 5 mm. In addition, a specific gravity value of each of the first circulation promoter 150 and the second circulation promoter 160 may be a value between the specific gravity value of the first solution 130 and the specific gravity value of the second solution 140.

That is, in a stationary state in which the battery 120 is not used and the case 110 is not moved, the first circulation promoter 150 and the second circulation promoter 160 may be disposed at an interface formed by the first solution 130 and the second solution 140. Preferably, the first circulation promoter 150 and the second circulation promoter 160 may be formed of solid-state acrylonitrile butadiene styrene (ABS) compound raw materials.

Meanwhile, in a use state in which the battery 120 is used and heat is generated and vibrations are generated according to movement of the case 110, the first circulation promoter 150 and the second circulation promoter 160 may flow in the first solution 130 and the second solution 140 to induce smooth circulation.

In detail, the specific gravity value of the first circulation promoter 150 may be a value between the specific gravity value of the first solution 130 and the specific gravity value of the second solution 140 and smaller than the specific gravity value of the second circulation promoter 160. That is, the first circulation promoter 150 may be disposed above the second circulation promoter 160. Preferably, the first circulation promoter 150 may have a specific gravity of 1.0 to 1.1.

The specific gravity value of the second circulation promoter 160 may be a value between the specific gravity value of the first solution 130 and the specific gravity value of the second solution 140 and greater than the specific gravity value of the first circulation promoter 150. That is, the second circulation promoter 160 may be disposed under the first circulation promoter 150. Preferably, the second circulation promoter 160 may have a specific gravity of 1.5 to 1.65.

Meanwhile, the heat radiation part 170 may be formed of a heat conductive material and disposed on the outer surface of the case 110 to radiate heat in the case 110 to the outside. Specifically, since the case 110 is formed in a sealed state, the heat generated in the case 110 is not radiated to the outside. That is, the heat radiation part 170 is formed of a material with high thermal conductivity and disposed to lower a temperature of the first solution 130 and a temperature of the second solution 140 by radiating the heat absorbed by the first solution 130 and the second solution 140 to the outside when the battery 120 is heated.

Specifically, the heat radiation part 170 may include a gap filler 171, which is disposed on the outer surface of the case 110 and on which a heat sink 172 is disposed on an outer side, and the heat sink 172 through which absorbed heat is radiated to the outside.

The gap filler 171 may be disposed on the outer surface of the case 110 to connect the heat sink 172 to the case 110. Preferably, the gap filler 171 may be formed to have a thermal conductivity of 1.0 to 2.5 W/(m-k). That is, the gap filler 171 may be disposed between the case 110 and the heat sink 172 to transfer heat generated in the case 110 to the heat sink 172.

The heat sink 172 may be disposed on the outer surface of the case 110 with the gap filler 171 disposed therebetween. Preferably, the heat sink 172 may be entirely or partially formed of aluminum. The heat sink 172 may receive heat generated in the case 110 through the gap filler 171 and discharge the heat to the outside. Since the technologies of the gap filler 171 and the heat sink 172 are already widely known, detailed descriptions thereof will be omitted.

Figure 3:
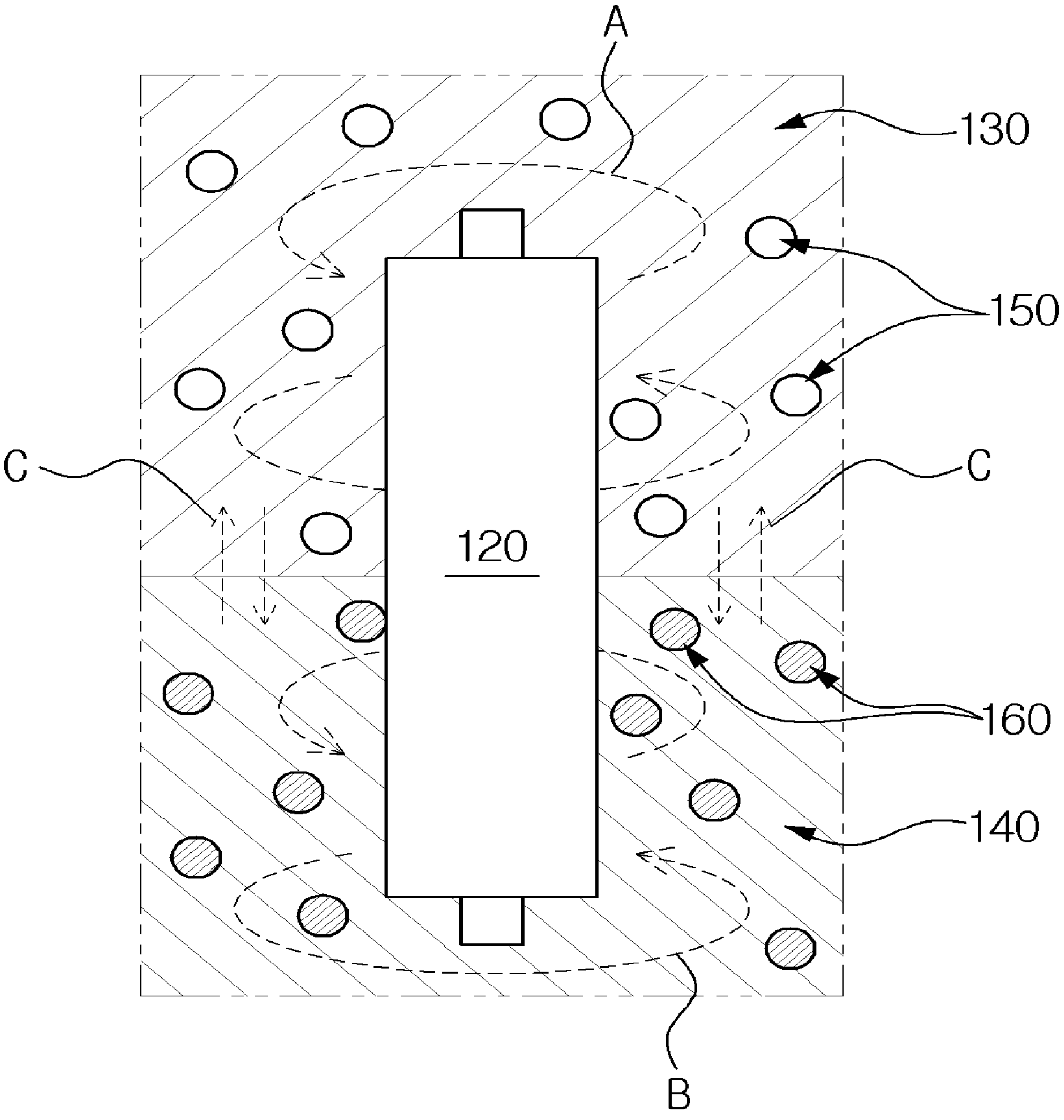
FIG. 3 is a view of an operating state of the battery fire safety structure illustrated in FIG. 1.

FIG. 3 is a view of an operating state of the battery fire safety structure illustrated in FIG. 1.

Further referring to FIG. 3, a process of cooling the battery 120 in the battery fire safety structure 100 will be described as follows.

First, when the battery 120 is not used and the case 110 is not moved, as illustrated in FIG. 2, the first solution 130, the second solution 140, the first circulation promoter 150, and the second circulation promoter 160 may be disposed as layers without mixing. In such a case, in the case 110, the first solution 130 may be disposed above the second solution 140, the first circulation promoter 150 and the second circulation promoter 160 may be disposed at the interface of the first solution 130 and the second solution 140, the first circulation promoter 150 may be disposed above the second circulation promoter 160, and the second circulation promoter 160 may be disposed under the first circulation promoter 150.

As described above, when heat is not generated in the battery 120 and vibrations are not generated because the case 110 is not moved, the first solution 130 and the second solution 140 may form an interface by being separated at upper and lower sides due to a difference in density therebetween. In this case, the first circulation promoter 150 and the second circulation promoter 160 may not be mixed, and may be disposed in order at the interface of the first solution 130 and the second solution 140 according to the difference in density.

Then, when the battery 120 is used and the case 110 is moved to generate vibrations and the like, as illustrated in FIG. 3, the first solution 130, the second solution 140, the first circulation promoter 150, and the second circulation promoter 160 may be mixed. Specifically, since the battery 120 generates heat while the battery is charged and discharged, the specific gravities of the first solution 130 and the second solution 140, which are in contact with the battery 120, are changed, and thus the first solution 130 and the second solution 140 may be mixed.

In this case, since the first solution 130 and the second solution 140 are different solutions, an amount of change in specific gravity according to temperature may be different. That is, the specific gravity of the first solution 130 and the specific gravity of the second solution 140 may be changed according to a change in temperature so that the first solution 130 and the second solution 140 may circulate in the case 110 as indicated by arrows C in FIG. 3.

In addition, the first solution 130 and the second solution 140 may perform the above-described circulation due to vibrations generated when a product on which the case 110 is mounted moves.

Meanwhile, the first circulation promoter 150 and the second circulation promoter 160 may flow in the first solution 130 and the second solution 140 as indicated by arrows A and B in FIG. 3 to induce the first solution 130 and the second solution 140 to circulate more easily. Specifically, according to a difference in specific gravity, the first circulation promoter 150 and the second circulation promoter 160 may mainly flow in the first solution 130 and the second solution 140, respectively.

More specifically, the flow of the first circulation promoter 150 and the flow of the second circulation promoter 160 may be caused by vibrations generated when the product on which the case 110 is mounted is moved, changes in specific gravity of the first solution 130 and the second solution 140, or both the vibrations and the changes.

The first circulation promoter 150 and the second circulation promoter 160 may be disposed to easily cool the battery 120 by allowing the first solution 130 and the second solution 140 to move irregularly. That is, the battery fire safety structure 100 of the present embodiment may be formed so that the first solution 130 and the second solution 140 may smoothly circulate even in a power-free state in which power is not supplied. That is, the first solution 130, the second solution 140, the first circulation promoter 150, and the second circulation promoter 160 may not chemically react with each other, and may flow and circulate as the first solution 130, the second solution 140, the first circulation promoter 150, and the second circulation promoter 160 interact spatially.

As described above, the battery fire safety structure 100 according to embodiments of the present invention has a feature in which cooling solutions 130 and 140 can circulate without power and the battery 120 can be cooled without energy consumption. Specifically, the first solution 130 and the second solution 140 having different specific gravities may be disposed as the cooling solutions 130 and 140, and thus the first solution 130 and the second solution 140 can circulate without power while temperatures and the specific gravities of the first solution 130 and the second solution 140 are changed due to heat generated by the battery 120. In addition, the cooling solutions 130 and 140 may circulate without power due to the vibrations generated by movement of the case 110.

In particular, since the cooling solutions 130 and 140 according to the embodiments of the present invention include the first solution 130 and the second solution 140, which have different specific gravities, the cooling solutions 130 and 140 may circulate more smoothly than a coolant formed from a single solution. In addition, the first circulation promoter 150 and the second circulation promoter 160 may flow in the cooling solutions 130 and 140 to more effectively induce circulation of the cooling solutions 130 and 140.

In addition, in the battery fire safety structure 100 according to the embodiments of the present invention, the battery 120 is immersed in the cooling solutions 130 and 140, and thus there are effects that the battery 120 can be more effectively cooled as compared to a method of cooling a battery having a conventional cooling path and a fire due to overheating of the battery 120 is prevented. That is, conventionally, since a battery is not in direct contact with a coolant, a fire is only prevented when thermal runaway of the battery occurs, and ultimately a fire may not be prevented. On the other hand, since the battery 120 of the present invention is completely immersed in the cooling solutions 130 and 140, a cooling effect of the battery 120 is significantly improved compared to the conventional case so that a temperature of the battery 120 can be efficiently managed, and a fire protection effect is achieved.

The battery fire safety structure according to embodiments of the present invention has a feature in which cooling solutions can circulate without power and a battery can be cooled without energy consumption. Specifically, a first solution and a second solution having different specific gravities may be disposed as the cooling solutions, and thus the first solution and the second solution can circulate without power while temperatures and the specific gravities of the first solution and the second solution are changed due to heat generated by the battery. In addition, the cooling solutions can circulate without power due to the vibrations generated by movement of the case.

In particular, since cooling solutions according to embodiments of the present invention include a first solution and a second solution, which have different specific gravities, the cooling solutions can circulate more smoothly than a coolant formed from a single solution. In addition, a first circulation promoter and a second circulation promoter can flow in the cooling solutions to more effectively induce circulation of the cooling solutions.

In addition, in a battery fire safety structure according to embodiments of the present invention, a battery is immersed in cooling solutions, and thus there are effects that the battery can be more effectively cooled as compared to a method of cooling a battery having a conventional cooling path and a fire due to overheating of the battery is prevented. That is, conventionally, since a battery is not in direct contact with a coolant, a fire is only prevented when thermal runaway of the battery occurs, and ultimately a fire may not be prevented. On the other hand, since the battery of the present invention is completely immersed in the cooling solutions, a cooling effect of the battery is significantly improved compared to the conventional case so that a temperature of the battery can be efficiently managed, and a fire protection effect is achieved.

However, technical effects that can be obtained through the embodiments of the present invention are not necessarily limited to the above-described effects. Other technical effects that are not described above might have been clearly understood by those skilled in the art to which the present invention belongs from the descriptions of the specification, such as the detailed description.

While the embodiments of the present invention have been described above, the present invention may be variously modified and changed by those skilled in the art by adding, changing, and removing components without departing from the spirit of the present invention, and the other embodiments also fall within the scope of the present invention.

What is claimed is:

1. A battery fire safety structure comprising:

a case (110) having an inner space;

a battery (120) disposed in the case (110);

a first solution (130) and a second solution (140) formed of liquids having electrical insulation properties that absorb heat generated in the battery (120) and disposed in the case (110) so that the battery (120) is immersed in the first solution (130) and the second solution (140); and a first circulation promoter (150) that is formed of a solid, which does not chemically react with the first solution (130) and the second solution (140), and of which a specific gravity value is a value between a specific gravity value of the first solution (130) and a specific gravity value of the second solution (140), wherein the second solution (140) is formed to have a specific gravity greater than a specific gravity of the first solution (130), and when the battery (120) is not used, the first solution (130) is disposed above the second solution (140).

2. The battery fire safety structure of claim 1, further comprising a second circulation promoter (160) that is formed of a solid, which does not chemically react with the first solution (130) and the second solution (140), and of which a specific gravity value is a value between the specific gravity value of the first solution (130) and the specific gravity value of the second solution (140) and the specific gravity is greater than the specific gravity of the first circulation promoter (150).

3. The battery fire safety structure of claim 2, wherein the first circulation promoter (150) and the second circulation promoter (160) promote circulation while flowing in the first solution (130) and the second solution (140) due to changes in temperature and specific gravity of the first solution (130) and the second solution (140) due to heat generated by the battery (120) and vibrations due to movement of the case (110).

4. The battery fire safety structure of claim 1, further comprising a heat radiation part (170) that is formed of a thermally conductive material and disposed on an outer surface of the case (110) to radiate heat in the case (110) to an outside of the case (110).

5. The battery fire safety structure of claim 4, wherein the heat radiation part (170) includes:

a gap filler (171) disposed between the case (110) and a heat sink (172); and the heat sink (172), which receives heat generated in the case (110) through the gap filler (171) and discharges the heat to the outside of the case (110).

6. The battery fire safety structure of claim 1, wherein the case (110) further includes a discharge valve (112) disposed on one side of the case (110) to discharge gas in the case (110) to an outside of the case (110).

7. The battery fire safety structure of claim 1, wherein the first solution (130) and the second solution (140) circulate without power due to changes in temperature and specific gravity due to heat generated by the battery (120) and vibrations due to movement of the case (110).

* * * * *